United States Patent
Bähr et al.

(10) Patent No.: US 11,043,322 B2
(45) Date of Patent: Jun. 22, 2021

(54) MAGNETIC VALVE AND METHOD FOR MANUFACTURING A MAGNETIC VALVE

(71) Applicant: RAPA Automotive GmbH & Co. KG, Selb (DE)

(72) Inventors: Sebastian Bähr, Selb (DE); Martin Klötzer, Selb (DE)

(73) Assignee: RAPA Automotive GmbH & Co. KG, Selb (DE)

( * ) Notice: Subject to any disclaimer, the term of this patent is extended or adjusted under 35 U.S.C. 154(b) by 169 days.

(21) Appl. No.: 16/269,722

(22) Filed: Feb. 7, 2019

(65) Prior Publication Data
US 2019/0249792 A1 Aug. 15, 2019

(30) Foreign Application Priority Data
Feb. 12, 2018 (DE) .................... 10 2018 103 046.0

(51) Int. Cl.
*H01F 7/08* (2006.01)
*F16K 31/06* (2006.01)
(Continued)

(52) U.S. Cl.
CPC .............. *H01F 7/081* (2013.01); *F16F 9/46* (2013.01); *F16K 27/048* (2013.01);
(Continued)

(58) Field of Classification Search
CPC .... H01F 7/081; H01F 7/128; H01F 2007/085; F16K 31/0668; F16K 31/0675; F16K 27/048; F16F 9/46
See application file for complete search history.

(56) References Cited

U.S. PATENT DOCUMENTS 3,908,700 A * 9/1975 Debaye ............... F16K 31/0675
137/625.65
3,909,758 A * 9/1975 Hans ................... F16K 31/0675
335/255
(Continued)

FOREIGN PATENT DOCUMENTS

DE 4309739 A1 9/1994
DE 60119406 T2 4/2007
(Continued)

OTHER PUBLICATIONS

The extended European search report dated Jul. 1, 2019, in corresponding European patent application No. 19155699.2; including partial machine-generated English language translation; 11 pages.
(Continued)

*Primary Examiner* — Eric Keasel
(74) *Attorney, Agent, or Firm* — Maier & Maier, PLLC

(57) ABSTRACT

A method for manufacturing a magnetic valve and a corresponding magnetic valve, in particular for the use for electrically continuously adjustable shock absorbers of a vehicle. A valve housing and a magnetic armature which is movably supported relative to a longitudinal axis of an electrically energizable coil and which is at least partially surrounded by a pole tube which is at least partially surrounded by a coil body of the coil that in turn is cast with a casting compound, provides a corrosion protection cap covering an axial end of the pole tube. The corrosion protection cap establishing a connection to the casting compound and protecting the axial end of the pole tube against corrosion influences from the atmosphere.

18 Claims, 3 Drawing Sheets

(51) Int. Cl.
　　　*H01F 7/128*　　　(2006.01)
　　　*F16K 27/04*　　　(2006.01)
　　　*F16F 9/46*　　　　(2006.01)

(52) U.S. Cl.
　　　CPC ...... *F16K 31/0668* (2013.01); *F16K 31/0675* (2013.01); *H01F 7/128* (2013.01); *H01F 2007/085* (2013.01)

(56) References Cited

U.S. PATENT DOCUMENTS

| | | |
|---|---|---|
| 5,011,113 A | 4/1991 | Stobbs et al. |
| 5,503,366 A | 4/1996 | Zabeck et al. |
| 2008/0164434 A1 | 7/2008 | Iwa et al. |

FOREIGN PATENT DOCUMENTS

| | | |
|---|---|---|
| DE | 102008008735 A1 | 9/2009 |
| DE | 102011078104 A1 | 12/2012 |

OTHER PUBLICATIONS

Office Action dated Feb. 1, 2019 in corresponding German Application No. 10 2018 103 046.0 including partial machine-generated English language translation; 14 pages.

\* cited by examiner

MAGNETIC VALVE AND METHOD FOR MANUFACTURING A MAGNETIC VALVE

FIELD

The present invention relates to a magnetic valve, on the one hand, and, on the other hand, to a method for manufacturing such a magnetic valve, in particular for use for electrically continuously adjustable shock absorbers of a vehicle.

BACKGROUND

Vehicles, in particular motor vehicles, usually have a chassis comprising several shock absorbers, springs, wheel suspensions, wheels and a body or a frame. Respectively one shock absorber, also referred to as a vibration damper, forms together with respectively one vehicle spring a link between a wheel suspension and the vehicle body. The shock absorber reduces vibrations of the vehicle spring, decelerates them and compensates for road irregularities. This allows driving stability, driving comfort and driving safety to be increased when driving with the vehicle.

The damping characteristic of a shock absorber can be changed by a magnetic valve. For this, depending on the position of the valve, a passage for an oil flow in the shock absorber is widened or narrowed so that a continuously adjusted setup of the chassis of the vehicle is enabled.

Magnetic valves usually have for this purpose a valve housing with an electrically energizable coil for generating an electromagnetic field. In addition, such valves usually comprise a magnetic armature which is movable along a longitudinal axis of the coil and is surrounded by a pole tube. The pole tube on its part is at least partially surrounded by a coil body of the coil and is part of a magnetic circuit in order to axially displace the magnetic armature by means of the energizable coil in the manner familiar to the person skilled in the art, so that the position of the valve and thus the passage for the oil flow can be regulated.

Since the magnetic valve is typically disposed at the outside of the shock absorber and thus is in contact with the atmosphere, external metallic parts of the magnetic valve must either be fabricated of rust-resistant material or protected against corrosion with a coating. Usually the external metallic parts are an end piece of the pole tube, which end piece comprises an axial end of the pole tube, and a magnetic disk radially adjacent to the end piece of the pole tube, which magnetic disk forms together with the pole tube part of the magnetic circuit. It is well known that non-corrosive metal materials with good magnetic properties are significantly more expensive compared to corrosive metal materials with good magnetic properties. Therefore, the magnetic disk and the multi-part pole tube are usually fabricated of corrosive metal materials, and upon the manufacture of such a magnetic valve the surfaces of said parts are provided with a corrosion protection.

The pole tube often has a multi-part configuration and usually comprises the end piece as well as a sleeve and a cartridge. During fabrication and mounting of the magnetic valve, the parts of the pole tube are welded together. Since the welding of coated parts is difficult if not impossible, the surface of the multi-part pole tube is only coated after the welding process. However, this causes an interruption in the mounting flow, i.e. upon the assembly of the magnetic valve, which in turn leads to an increase in the costs of manufacturing the magnetic valve. The increase in costs is here due, for example, to additional costs resulting from interim storage.

According to an alternative, in order to protect the pole tube consisting of highly corrosive metal material from corrosion upon the later usage of the magnetic valve at the shock absorber, on the one hand, and, on the other hand, to not interrupt the mounting flow upon manufacturing the magnetic valve, both the axial end of the pole tube and the magnetic disk are cast together with the coil in the valve housing by means of a casting compound. Such a magnetic valve according to the prior art is shown schematically in FIG. 3.

However, it turned out to be problematic that process-related variations with regard to a thickness of the casting compound, caused by tolerances during the filling operation or shrinkage effects during the curing of the casting compound, require a minimum thickness of the casting compound above the axial end of the pole tube. This ensures that the cured casting compound withstands operating loads and usage conditions of the magnetic valve, such as temperature changes, vibrations and the like. However, this minimum thickness of the casting compound leads to an increase in the overall size of the magnetic valve.

SUMMARY

The object of the present invention is therefore to supply a simple and cost-effective method for manufacturing a magnetic valve of compact construction, in particular for electrically continuously adjustable shock absorbers of a vehicle, on the one hand, and to supply an accordingly simply and cost-effectively manufacturable magnetic valve which is of a compact construction, on the other hand.

The object is achieved, on the one hand, by a method for manufacturing a magnetic valve and, on the other hand, by a magnetic valve.

One aspect of the invention relates to a magnetic valve, in particular for electrically continuously adjustable shock absorbers of a vehicle, which has an electrically energizable coil with a coil body and a longitudinal axis and which is cast in a valve housing by means of a casting compound. In addition, the magnetic valve comprises a magnetic armature movably supported relative to the longitudinal axis of the coil, which magnetic armature is at least partially surrounded by a pole tube. The pole tube itself in turn is at least partially surrounded by the coil body of the coil. In addition, one axial end of the pole tube is covered with a corrosion protection cap connected to the casting compound, such that this end is protected against corrosion influences from the atmosphere.

The magnetic valve on which the invention is based can be manufactured simply and cost-effectively, because, on the one hand, the pole tube and the magnetic disk can be fabricated from a low-cost magnetizable metal material and, on the other hand, a cost and time-intensive coating process for said parts, in particular after the welding of parts of the pole tube, is no longer necessary, so that an uninterrupted mounting of the magnetic valve is guaranteed. Moreover, the magnetic valve according to the invention can have a lower overall height than a magnetic valve manufactured according to the prior art, in which the coil, the axial end of the pole tube and the magnetic disk are cast by means of a casting compound. This is possible because the corrosion protection cap covering the axial end of the pole tube can have a lower minimum thickness, i.e. wall thickness, than the casting compound of the magnetic valve at the axial end of the pole tube known from the prior art, because the corrosion protection cap can be precisely fabricated as a separate element of the magnetic valve by certain methods. In contrast, the thickness of the casting compound of the magnetic valve known from the prior art is subject to process-related variations caused by tolerances during the filling operation or shrinkage effects during the curing of the casting compound, so that the casting compound must have a certain thickness to ensure that the cured casting compound can withstand operating loads and usage conditions of the magnetic valve, such as temperature changes, vibrations and the like. Such restrictions do not apply or apply only to a limited extent to a separate corrosion protection cap.

In a preferred embodiment, the end of the pole tube covered with the corrosion protection cap extends in the axial direction beyond the casting compound. Therefore, the magnetic valve has comparatively little casting compound, so that weight and material costs with regard to the casting compound are reduced.

Preferably, the end of the pole tube covered with the corrosion protection cap extends in the axial direction beyond an axial outer edge of the valve housing. Particularly preferably, the end of the pole tube covered with the corrosion protection cap extends in the axial direction beyond all the axial outer edges of the valve housing. In other words, an axial overall height of the valve housing can be reduced in dependence on an axial wall thickness of the casting compound, provided that the valve housing still fulfils its protective and limiting function against the casting compound. Reducing the axial overall height of the valve housing leads to material savings with regard to the valve housing and, moreover, to a reduction in the axial overall size of the magnetic valve. Particularly preferably, the corrosion protection cap is fabricated of plastic, in particular of a plastic from the group of thermoplastics, thermosets and elastomers. The corrosion protection cap is preferably a plastic injection-molded part. On the one hand, plastic injection-molded parts can be produced particularly cost-effectively in series and, on the other hand, they can be manufactured particularly precisely with regard to their dimensions. The corrosion protection cap can therefore have a wall thickness of 1 mm or less, so that the axial overall size of the magnetic valve is small.

In a special embodiment, the coil body and the corrosion protection cap as well as a magnetic disk located between the coil body and the corrosion protection cap are pre-mounted to each other to form a unit. The coil body fabricated of plastic comprises for this purpose particularly preferably one or several snap hooks which engage the corrosion protection cap through openings in the magnetic ring (or vice versa) so that the coil body, the magnetic disk and the corrosion protection cap are firmly connected to each another. This allows the magnetic valve to be pre-mounted in a particularly simple and time-saving manner. Winding the coil is then effected on the pre-mounted unit. In particular, in so doing, an electrical connection can be established between the coil and a plug connection terminal of the magnetic valve, if—further advantageous—this plug connection terminal is integrated in the corrosion protection cap. This allows the electrical connection to be completely cast with the casting compound and thus protected against damage.

According to a special embodiment, the corrosion protection cap is designed in a different color than the casting compound. Particularly preferably, magnetic valves defined in a group of magnetic valves are in each case provided with a corrosion protection cap having a defined color which contributes to the marking of the respective magnetic valve. For this, the colors of the corresponding corrosion protection caps may differ from each other. The corrosion protection caps may moreover or alternatively have different characters, in particular inscriptions in the form of letters, numbers or the like. The characters can be applied to the protection caps by laser inscription, an embossing or by any other marking method familiar to the person skilled in the art. With the help of the marked corrosion protection caps, the magnetic valves can be distinguished, for example, with respect to their overall size or their performance, so that, for example, a faster and thus more cost-effective allocation can be made with regard to their use.

A further aspect of the invention relates to a method for manufacturing a magnetic valve, in particular for electrically adjustable shock absorbers of a vehicle. In one method step, a pole tube and a coil having a coil body are inserted axially into a valve housing, the coil body at least partially surrounding the pole tube. A further step provides to cast the coil and the coil body with a casting compound. In a further step, an axial end of the pole tube is covered with a corrosion protection cap in such a way that a connection is established between the casting compound and the corrosion protection cap and the axial end of the pole tube is protected against corrosion influences from the atmosphere. The specified steps can, but do not necessarily have to be executed in the stated order. Particularly preferably, the steps specified below are performed in advance. One of these steps provides to connect the coil body, the corrosion protection cap and a magnetic disk located between the coil body and the corrosion protection cap to each other, preferably by means of one or several snap hooks located on the coil body, to form a unit. In a further step, the coil is wound around the coil body.

Preferably, the manufacture of the magnetic valve is effected with a corrosion protection cap manufactured by means of an injection molding method, preferably plastics from the group of thermoplastics, thermosets and elastomers being employed in the injection molding method. Elements manufactured by injection molding can be manufactured particularly precisely and cost-effectively. The corrosion protection cap can therefore be configured in a particularly thin-walled fashion. Particularly preferably, the corrosion protection cap has a wall thickness of 1 mm or less.

BRIEF DESCRIPTION OF THE DRAWINGS

A preferred embodiment of the invention as well as further advantageous realizations are explained in more detail with reference to the accompanying drawings. There are shown.

DETAILED DESCRIPTION

Figure 1:
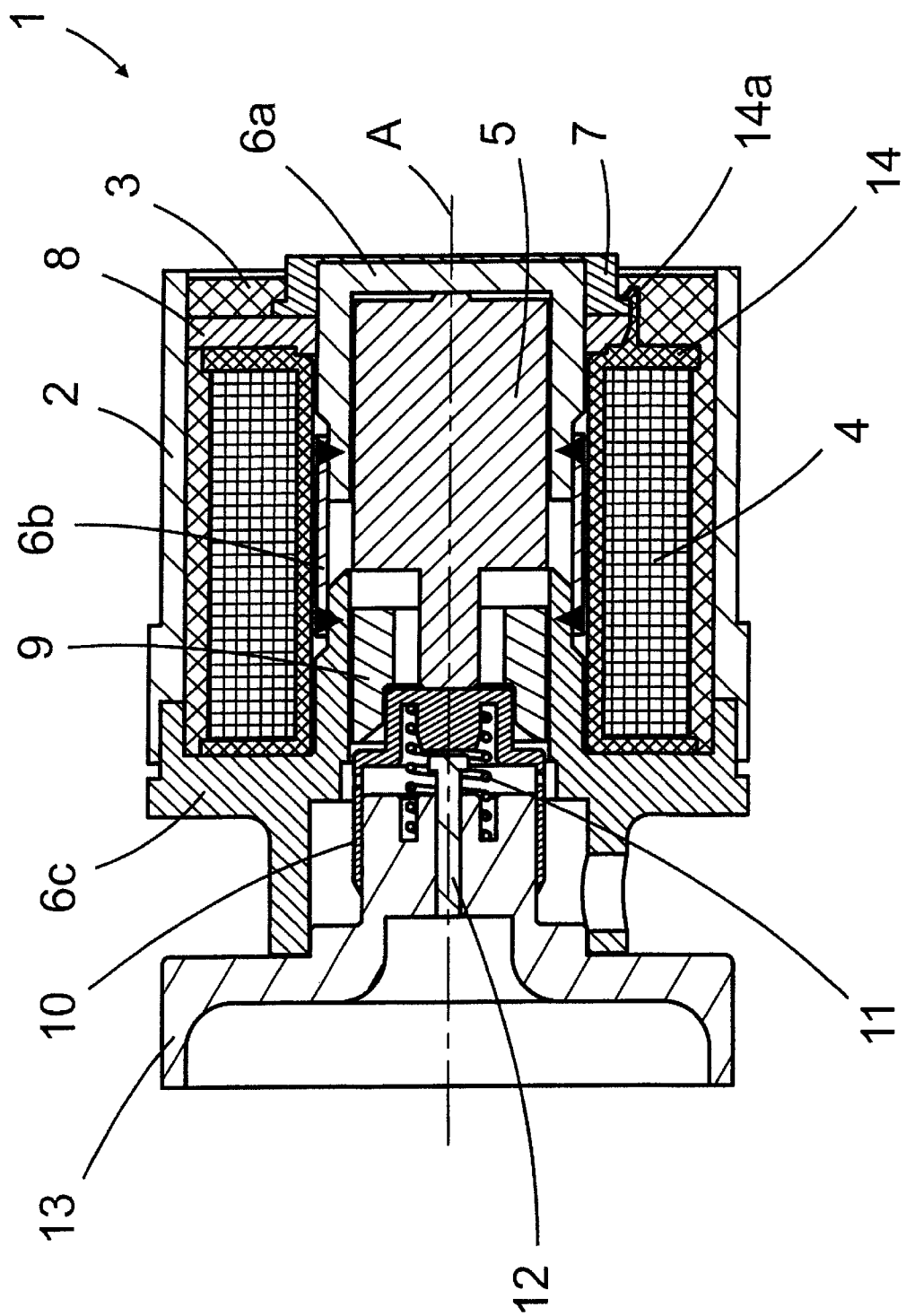
FIG. 1 a magnetic valve having a corrosion protection cap, schematically in a sectional view.

FIG. 1 is a magnetic valve 1 according to the invention, in particular for an electrically continuously adjustable shock absorber of a vehicle, represented in a preferred embodiment. The magnetic valve 1 has an electrically energizable coil 4 which is cast in a valve housing 2 by means of a casting compound 3. For example, a two-component polyurethane adhesive can be employed as a casting compound 3. However, other plastics are also suitable as a casting compound 3. In addition, the magnetic valve 1 comprises a magnetic armature 5 movably supported relative to a longitudinal axis A of the coil 4, which magnetic armature is at least partially surrounded by a three-part pole tube 6a, 6b, 6c. The pole tube 6a, 6b, 6c comprises an end piece 6a, a sleeve 6b, and a cartridge 6c. The sleeve 6b is welded to the end piece 6a and the cartridge 6c. The pole tube 6a, 6b, 6c itself is at least partially surrounded by a coil body 14 of the coil 4.

When the coil 4 is energized, a magnetic circuit extending through the pole tube 6a, 6b, 6c and a magnetic disk 8 and the housing 2 is formed in the manner familiar to the person skilled in the art and leads to an axial displacement of the magnetic armature 5. The end piece 6a and the cartridge 6c of the pole tube as well as the magnetic disk 8 located in the valve housing 2 are fabricated of a corrodible metallic material. Therefore, the end piece 6a and the cartridge 6c of the pole tube 6a, 6b, 6c as well as the magnetic disk 8 have particularly good magnetic properties.

The magnetic valve 1 of the invention also includes a corrosion protection cap 7. The coil body 14 and the corrosion protection cap 7 as well as the magnetic disk 8 located between the coil body 14 and the corrosion protection cap 7 are connected by means of snap hooks 14a located at the coil body 14 to form a unit. As a result, the magnetic valve 1 is particularly easy and time-saving to install. The corrosion protection cap 7 covers an axial end of the pole tube 6a, 6b, 6c and establishes a connection to the casting compound 3 so that the axial end of the pole tube 6a, 6b, 6c is protected against corrosion influences from the atmosphere. Establishing the connection is effected by curing the casting compound 3.

The corrosion protection cap 7 can be configured as a plastic injection-molded part, for example plastics from the group of thermoplastics, thermosets or elastomers can be utilized in the manufacture of the cap 7. Plastic injection molded parts can be manufactured with particular precision, so that the corrosion protection cap 7 can be configured in particularly thin-walled fashion. The wall thickness of the cap 7 may be, for example, 1 mm or less. According to the invention, on the one hand, the axial end of the pole tube 6a, 6b, 6c is protected against corrosion influences from the atmosphere by the corrosion protection cap 7, and on the other hand, the magnetic valve 1 can have a small axial overall size due to the small wall thickness of the cap 7.

In order to keep the axial overall size of the valve housing 2 particularly small, moreover, the end of the pole tube 6a, 6b, 6c covered with the corrosion protection cap 7 extends in the axial direction beyond at least one axial outer edge of the valve housing 2, preferably beyond all the axial outer edges of the valve housing 2 on this side as well as beyond the casting compound 3.

The corrosion protection cap 7 is designed in a different color than the casting compound 3. In a group of magnetic valves 1 of the invention, defined magnetic valves 1 are each provided with a corrosion protection cap 7 having a predetermined labelling, so that the corrosion protection cap 7 contributes to the marking of the respective magnetic valve 1 and magnetic valves 1 can be distinguished with respect to their overall size or other criteria. For this purpose, corrosion protection caps 7 determined in advance have, compared to other corrosion protection caps 7, for example a different coloring or a different inscription with characters defined in advance. Letters, numbers and the like can be employed as characters. The characters can be applied to the corrosion protection caps in any way familiar to the person skilled in the art, in particular by laser inscription or embossing.

Figure 2:
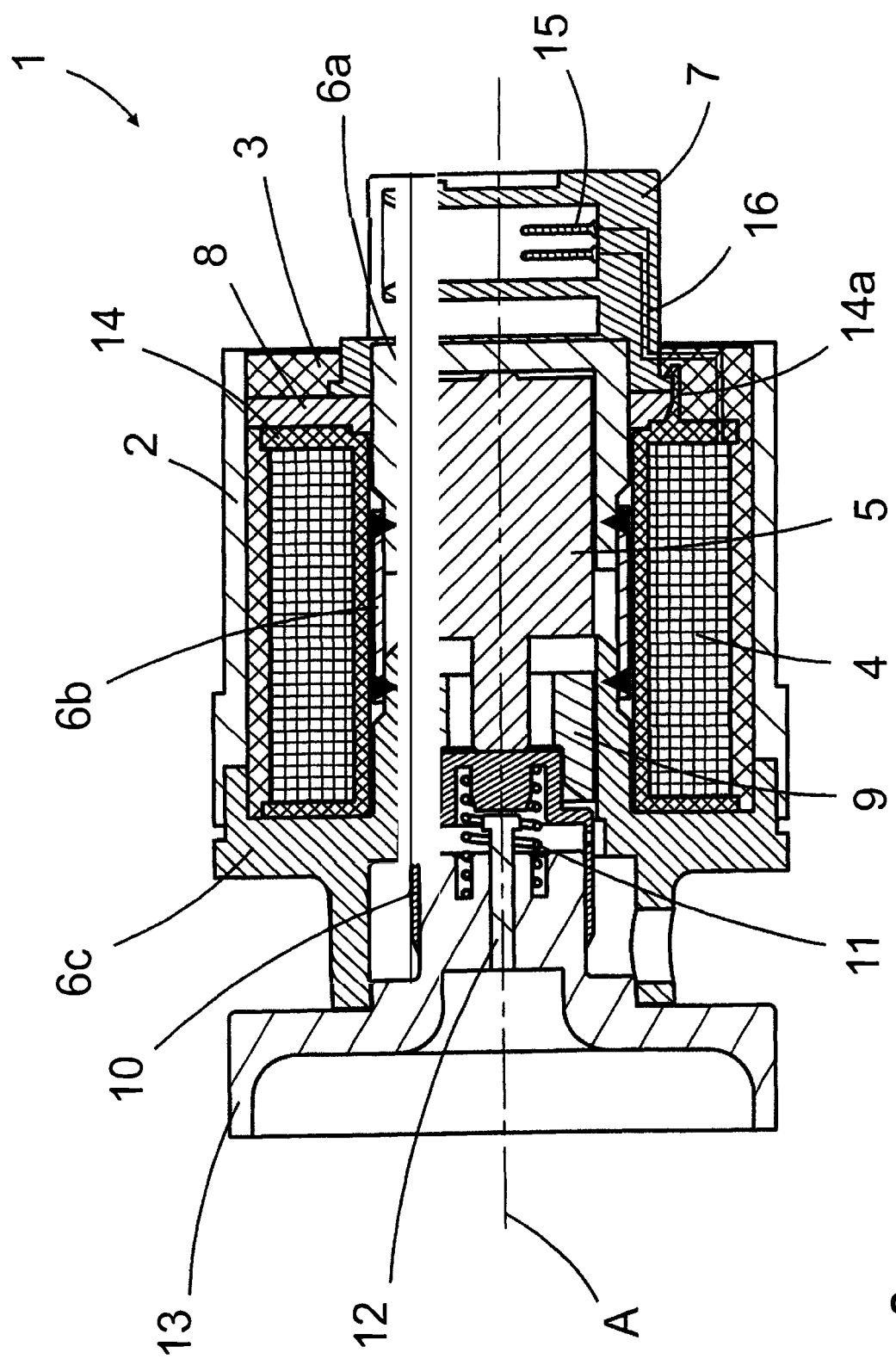
FIG. 2 the magnetic valve having a corrosion protection cap comprising a plug connection, schematically in a sectional view.
Figure 3:
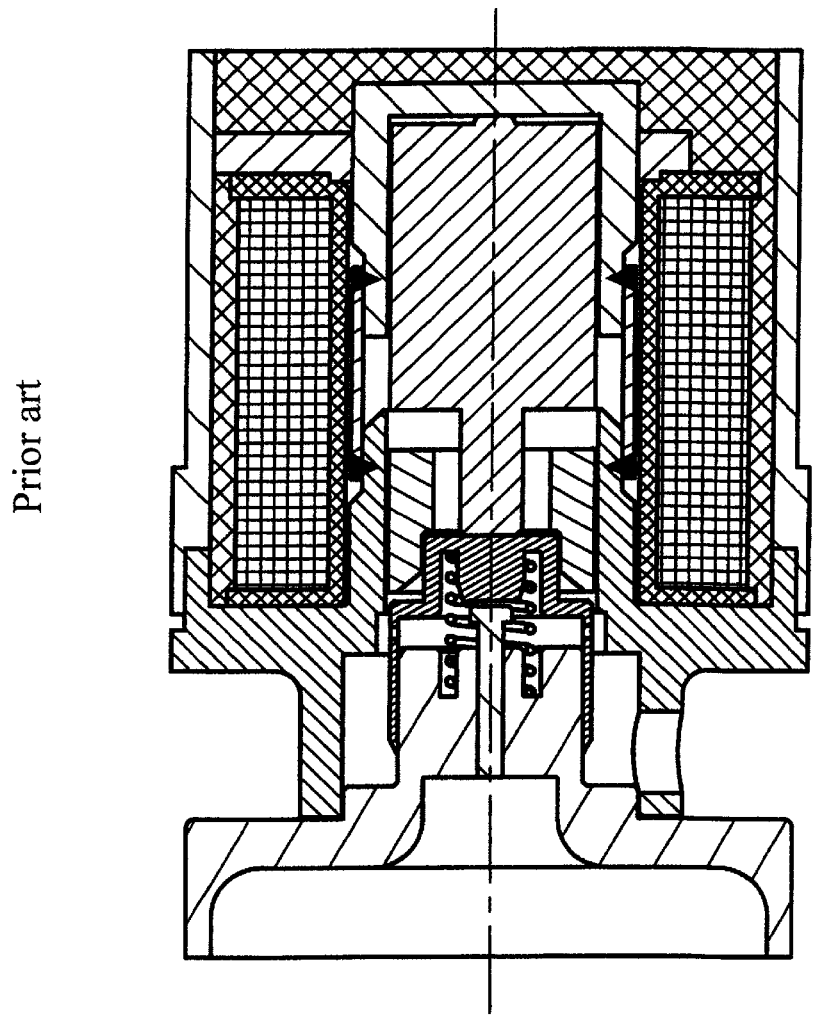
FIG. 3 a magnetic valve of the prior art.

FIG. 2 shows a second embodiment example of a magnetic valve 1, which has the same elements as the embodiment example shown in FIG. 1, but in contrast comprises a special corrosion protection cap 7. The corrosion protection cap 7 of the magnetic valve 1 shown in FIG. 2 has a first part of an electrical plug connection, which is electrically connected to the coil 4 and which is arranged to receive an associated second part of the electrical plug connection so that a connection can be established between the coil 4 and an external voltage source to electrically energize the coil 4. This first part of the electrical plug connection can be, as in this case, a built-in plug with contact pins 15 facing outwards in the radial direction, which is also known as the "male part" of the electrical plug connection. Accordingly, the second part of the electrical plug connection is a coupling with contact openings facing inwards, this also being known as the "female part" of the electrical plug connection. "Female part" and "male part" may also be exchanged, and also other plug connections or even other connection types are possible. Electrical connecting lines 16 existing between the contact pins 15 and the coil 4 run approximately in a z-shape or s-shape within the corrosion protection cap 7, emerge from the corrosion protection cap 7 in the radial direction and after the emergence up to the coil 4 they are completely cast with the casting compound 3. On the one hand, this protects said lines 16 against damage and, on the other hand, the corrosion protection cap 7 also provides the connection to the voltage source.

The magnetic valve 1 according to the embodiment example of FIG. 1 or FIG. 2 can for example be manufactured with the following method steps, in the specified or in a different order.

One method step provides the welding of the parts of the pole tube 6a; 6b; 6c. In doing so, the sleeve 6b is welded to the cartridge 6c and the end piece 6a comprising the axial end of the pole tube 6a, 6b, 6c. A further step provides the pre-mounting of the coil body 14 with the corrosion protection cap 7 and the magnetic disk 8 located between the coil body 14 and the corrosion protection cap 7, so that they form an independently manageable unit. The pre-mounting is advantageously realized by means of one or several snap hooks 14a located at the coil body 14. For this purpose, the magnetic ring 8 is placed with an axial side against the corrosion protection cap 7 and is aligned such that the snap hooks 14a are guided through openings in the magnetic ring 8 into an end position in which the snap hooks 14a embrace an undercut of the corrosion protection cap 7 in such a way that the coil body 14, the magnetic disk 8 and the corrosion protection cap 7 are firmly connected to each another. A further method step provides the winding of coil 4 on the coil body 14 of the pre-mounted unit. In a further step, said unit and the welded pole tube 6a, 6b, 6c are inserted axially into the valve housing 2. In doing so, said unit is arranged such that the coil body 14 at least partially surrounds the pole tube 6a, 6b, 6c and the corrosion protection cap 7 covers the pole tube 6a at one axial end such that this end is protected against corrosion influences from the atmosphere. A further step provides casting the coil 4 through an axial opening of the magnetic disk 8 with a casting compound 3. In doing so, with the casting compound 3 also the magnetic disk 8 and the corrosion protection cap 7 covering the axial end of the pole tube 6a, 6b, 6c are cast so that between the corrosion protection cap 7 and the casting compound 3 there exists a connection and the axial end of the pole tube 6a, 6b, 6c is permanently protected against corrosion influences from the atmosphere. The connection is established by curing the casting compound 3. In a further step the magnetic armature 5 is inserted into the pole tube 6a, 6b, 6c and a pressing 9 is pressed into the cartridge 6c. Subsequently, a slide 10 is inserted into the cartridge 6c, the slide 10 being adjacent to the pressing 9. After the inserting of a piston 12 into a valve body 13, a spring 11 is inserted into the slide 10. Alternatively, the spring 11 can also be inserted into the valve body 13. Finally, the cartridge 6c is pressed onto the valve body 13.

The invention claimed is:

1. A magnetic valve comprising:
    an electrically energizable coil which has a coil body and is cast in a valve housing by a casting compound;
    a magnetic armature movably supported relative to a longitudinal axis of the coil; and
    a magnetic pole tube which at least partially surrounds the magnetic armature and is at least partially surrounded by the coil body,
    wherein a corrosion protection cap connected to the casting compound covers the magnetic pole tube at one axial end such that this end is protected against corrosion influences from the atmosphere,
    wherein the one axial end of the magnetic pole tube covered with the corrosion protection cap extends in an axial direction beyond the casting compound.

2. The magnetic valve according to claim 1, wherein the corrosion protection cap has a wall thickness in the axial direction of 1 mm or less.

3. The magnetic valve according to claim 1, wherein the one axial end of the magnetic pole tube covered with the corrosion protection cap extends in the axial direction beyond an axial outer edge of the valve housing.

4. The magnetic valve according to claim 1, wherein the corrosion protection cap has plastic selected from a group of thermoplastics, thermosets, and elastomers.

5. The magnetic valve according to claim 1, wherein the corrosion protection cap is a plastic injection-molded part.

6. The magnetic valve according to claim 1, wherein the corrosion protection cap is designed in a different color than the casting compound.

7. The magnetic valve according to claim 1, wherein the coil body and the corrosion protection cap as well as a magnetic disk located between the coil body and the corrosion protection cap are connected to each another, by one or several snap hooks, to form a unit.

8. The magnetic valve according to claim 1, wherein the corrosion protection cap including an electrical plug connection terminal which is connected electroconductively to the coil in order to establish an electrical connection between the coil and an external voltage source.

9. A method for manufacturing a magnetic valve, for electrically continuously adjustable shock absorbers of a vehicle, comprising:
    inserting a magnetic pole tube and a coil having a coil body into a valve housing, wherein the coil body at least partially surrounds the magnetic pole tube;
    casting the coil and the coil body with a casting compound; and
    covering an axial end of the magnetic pole tube with a corrosion protection cap in such a way that a connection is established between the casting compound and the corrosion protection cap and the axial end of the pole tube is protected against corrosion influences from the atmosphere,
    wherein the axial end of the magnetic pole tube covered with the corrosion protection cap extends in an axial direction beyond the casting compound.

10. The method according to claim 9, further comprising the following steps to be performed in advance:
    connecting the coil body to the corrosion protection cap and to a magnetic disk located between the coil body and the corrosion protection cap, by one or several snap hooks located at the coil body, to form a unit; and
    winding the coil on the coil body.

11. The method according to claim 9, wherein the corrosion protection cap is manufactured by an injection molding method, wherein plastic is utilized.

12. The method according to claim 9, wherein the one axial end of the magnetic pole tube covered with the corrosion protection cap extends in the axial direction beyond an axial outer edge of the valve housing.

13. The method according to claim 9, wherein the corrosion protection cap has a wall thickness in the axial direction of 1 mm or less.

14. A group of magnetic valves, each valve comprising:
    an electrically energizable coil which has a coil body and is cast in a valve housing by a casting compound;
    a magnetic armature movably supported relative to a longitudinal axis of the coil; and
    a magnetic pole tube which at least partially surrounds the magnetic armature and is at least partially surrounded by the coil body,
    wherein a corrosion protection cap connected to the casting compound covers the magnetic pole tube at one axial end such that this end is protected against corrosion influences from the atmosphere,
    wherein the one axial end of the magnetic pole tube covered with the corrosion protection cap extends in an axial direction beyond the casting,
    wherein the corrosion protection caps associated with the magnetic valves of the group of magnetic valves are marked differently.

15. The group according to claim 14, wherein the different markings of the corrosion protection caps are realized by a different coloring of the corrosion protection caps.

16. The group according to claim 14, wherein the different markings of the corrosion protection caps are realized by different inscriptions.

17. The group according to claim 14, wherein the axial end of the magnetic pole tube covered with the corrosion protection cap extends in the axial direction beyond an axial outer edge of the valve housing.

18. The group according to claim 14, wherein the corrosion protection cap has a wall thickness in the axial direction of 1 mm or less.

* * * * *